A. E. BIMMERLE.
PROCESSING APPARATUS.
APPLICATION FILED OCT. 10, 1907.
904,300.
Patented Nov. 17, 1908.
2 SHEETS—SHEET 1.
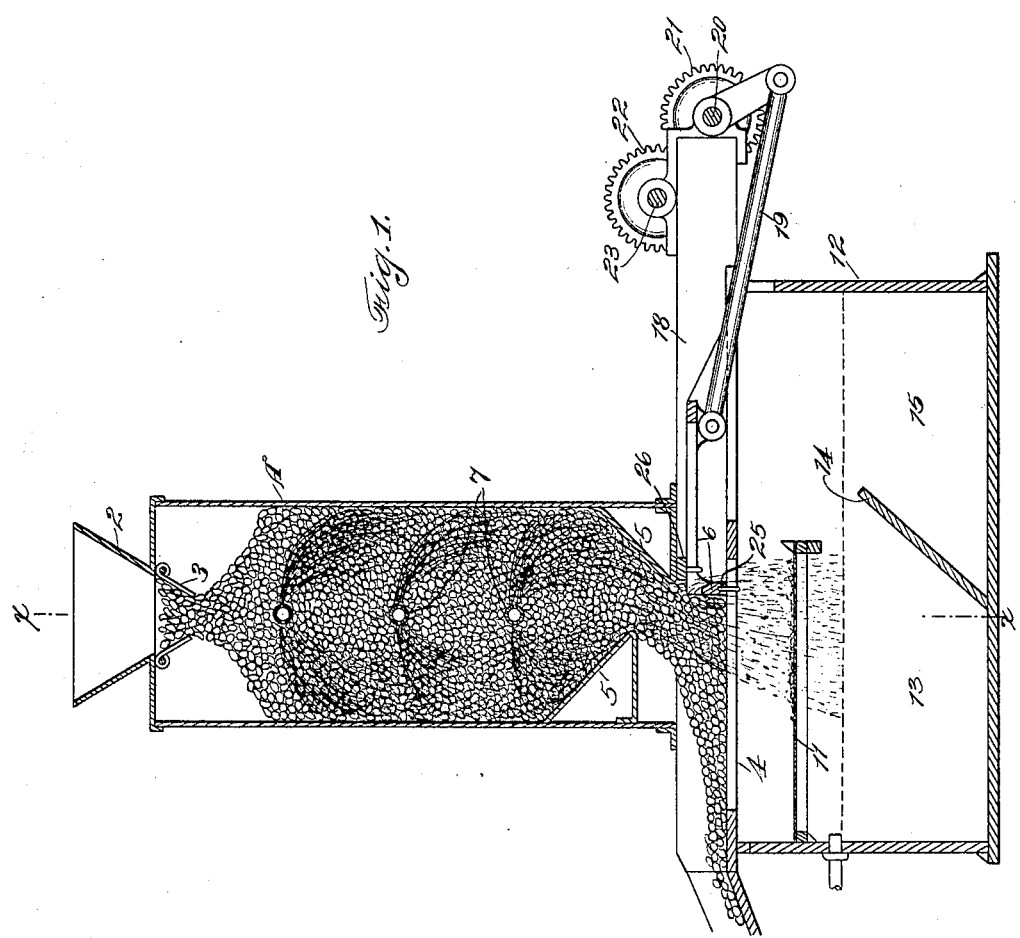
Witnesses:
Inventor:
Augustus E. Bimmerle;
By Geo. H. Strong.
Atty.

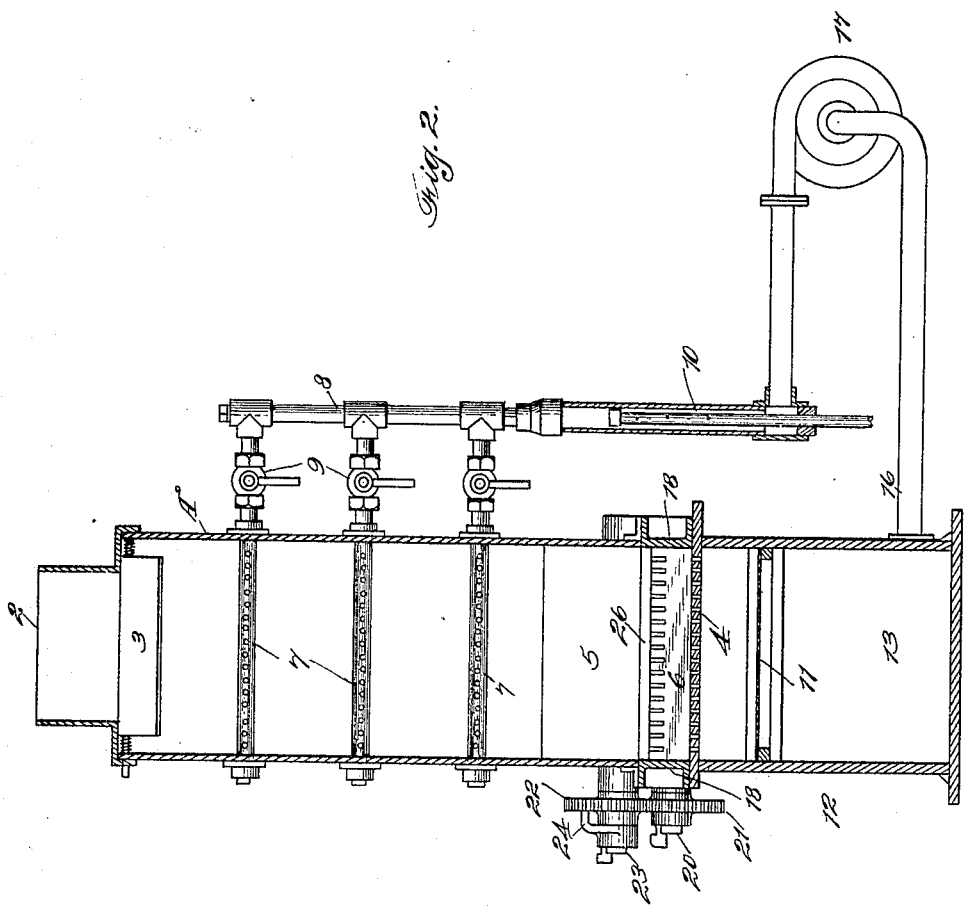

UNITED STATES PATENT OFFICE.

AUGUSTUS E. BIMMERLE, OF EDEN VALE, CALIFORNIA.

PROCESSING APPARATUS.

No. 904,300.  Specification of Letters Patent.  Patented Nov. 17, 1908.

Application filed October 10, 1907. Serial No. 396,781.

*To all whom it may concern:*

Be it known that I, AUGUSTUS E. BIMMERLE, citizen of the United States, residing at Eden Vale, in the county of Santa Clara and State of California, have invented new and useful Improvements in Processing Apparatus, of which the following is a specification.

My invention relates to an apparatus for processing dried prunes and other fruits.

The object of the present invention is to provide a simple, practical apparatus of large capacity by which the fruit may be easily and economically processed, and by which the fruit will be subjected to a minimum amount of handling and bruising; in which the fruit will not only be processed, but thoroughly washed (this latter feature is valuable, and is not found in any other machine of which I have knowledge); in which the dirt, leaves, pits, stems, etc., can be readily removed separate from the fruit; in which an economy of steam is effected, since the steam and water are directly applied to the fruit, and the heat is not used, as is commonly the case, in first heating up buckets carrying the fruit; in which it is not necessary to heat a large volume of water before starting the processor; in which the water can be heated, if desired, before being applied to the fruit to a much higher temperature than in the open form of vat type of apparatus, since in the present apparatus, as will be hereafter explained, the water is confined in a heating tube before emerging, and also there is practically no escape or loss of steam from boiling over; in which machine a wide range of processing speeds or lengths of time for treating fruit is supplied, and in which there is absolutely no loss of fruit during the processing.

The invention consists of the parts and the construction and combination of parts as hereinafter more fully described and claimed, having reference to the accompanying drawings, in which—

Figure 1 is a longitudinal section of the apparatus. Fig. 2 is a section on line X—X of Fig. 1.

A represents a shell or container of any suitable size, shape and material, and inclosing the processing chamber. In actual practice, if the shell is made circular it is about six feet high and twenty-four inches in diameter. The fruit is fed in at the top through a hopper 2 and a spring actuated trap-door 3, which is normally closed to prevent the escape of the steam from the processing chamber. The bottom of the chamber is so constructed as to form a partial support for the prunes, at the same time providing a restricted discharge opening through which the prunes may flow by gravity on to the horizontal grating 4.

As here shown, the bottom of the shell A is arranged in convergent planes 5 suitably spaced from each other to form a lateral discharge for the prunes on to the grating 4. This arrangement is for the purpose of removing the weight of the prunes above from the grating and from the reciprocating plunger 6, by which latter the processed prunes are discharged from the apparatus. By thus supporting the column of prunes and discharging them in the manner described, there is little or no danger of mashing or cutting the fruit as the plunger 6 travels back and forth.

The processing treatment of the confined column of prunes is effected by one or more jet tubes 7, suitably arranged inside the shell A, and suitably connected with any appropriate source of hot water or steam supply. Preferably there are a plurality of these jet tubes arranged one above the other at suitable intervals, each tube being so perforated that it will project a spray of hot water or other liquid outward and downward in all directions through the surrounding mass of prunes. The percolating of the hot water or other liquid through the prunes for prescribed periods of time effects the desired processing, as it is called. In the present instance, I have shown three of these jet tubes arranged one above the other, and each tube connected with a water supply pipe 8, and a cock 9 controlling the flow of processing fluid through each tube. The water passing through the pipe 8 may be heated by any suitable means, preferably by means of the steam jet 10, as shown. The processed fruit and the water of condensation passes by gravity down through the processor A on to the grating 4; the water draining through the grating 4 and through the dirt screen 11 beneath, into the storage tank 12. The screen 11 serves to catch the dirt, leaves, pits, etc., these being readily removable at any time. The water falls into the settling chamber 13 of tank, 12, where the sediment collects; the clear water overflowing the partition 14 into the chamber 15, whence the water is withdrawn through the pipe 16 and forced again by suitable means, as the pump 17, through the apparatus; being re-heated in transit by introducing live steam through the pipe 10 in the delivery pipe 8.

The plunger 6 is slotted in the direction of its length, so as to allow the water in the prunes to drain through it when the plunger moves forward. The slats of the plunger and the grating bars 4 are arranged about a quarter of an inch apart. The plunger moves between the lengthwise extending channel guides 18, on the top of which the processing shell A is supported. Any appropriate means may be employed to reciprocate the plunger. As here shown, the plunger is connected by a pitman 19 with the crank-shaft 20. The shaft 20 carries a loose gear 21 meshing a corresponding loose gear 22 on the drive-shaft 23. These gears 21—22, while normally loose on their respective shafts so as to be readily removable, are held thereon in operative position by means of rigid dogs 24 on the shafts. The object of this construction is to enable the discharging speed of the follower 6 to be changed to suit the different kinds of prunes being processed, by simply using different sized gears to secure different processing speeds.

One manner of determining the length of the processing operation is by regulating the number of strokes per minute of the follower 6. Thus, for instance, if the follower 6 makes four strokes a minute, and fruit is five minutes in descending from the upper jet tube 7 to its point of discharge, consequently the fruit will have been processing for five minutes. Now, if a pair of gears 21—22 are selected, so as to increase the speed of the plunger, say to eight strokes a minute, the fruit being discharged twice as fast, will descend in half the time, or will be processing for two and a half minutes. Any appropriate means, not necessary here to be shown, may be employed to operate the drive-shaft 23.

Under some circumstances, it may be more convenient, or otherwise preferable, to regulate the length of the processing treatment by means of the jet tubes 7. Thus, by having a plurality of tubes 7, I may vary the length of time of the processing treatment without changing the rate of discharge of the prunes, or the speed of the plunger 6. For instance, if the plunger is operating at such a rate that it takes six minutes for the prunes to descend from the upper jet tube to the point of discharge, and assuming the upper jet tube to be spraying hot water over and through the fruit, I can, by closing the upper jet tube and opening the second one, subject the fruit to a shorter treatment; and so on, correspondingly lengthen or shorten the length of the processing treatment, according to whether a lower or an upper jet is operating, all in a manner readily understood.

In operating the machine, the processing chamber is preferably maintained full of prunes, or as nearly so as is practical; at least, the jet tube which is open should always be covered, so as to prevent escape of steam, and to insure that the prunes should receive a uniform length of time of treatment. The object of the swinging door 3 is to prevent the escape of steam in case the jet tube should be uncovered by not feeding the fruit in fast enough.

The operation of the apparatus is briefly as follows: The processing chamber being filled with fruit, one or other, or, if desired, two or more, of the jet tubes are opened, and after a suitable lapse of time the plunger is set in operation. Having determined the length of time that it is necessary to process the fruit, the further operation of the apparatus is entirely automatic. The plunger moves forward at stated intervals to push the processed fruit forward off of the grating 4 into any suitable delivery mechanism. The forward end or nose of the plunger carries a comb 25 which has its pins or teeth operating between the grate bars 4 for the purpose of removing skins, leaves, pits, et. A corresponding stationary comb 26 is arranged above the plunger, and it has its teeth or pins similarly operating between the slats of the plunger 6. The water draining from the prunes passes down into the tank 12, is settled therein, and is pumped or otherwise forced thence back through the apparatus, re-heated in transit, and thus used over and over again.

Having thus described my invention, what I claim and desire to secure by Letters Patent is—

1. A processor, comprising a container for the fruit to be processed, said container having a feed opening, and having also a laterally arranged delivery opening at the bottom, a receiving surface for the prunes beneath the opening, a plunger reciprocal across said receiving surface for removing the prunes, means for introducing a processing medium into the container, and a self-acting trap-door at the entrance to the container adapted to automatically close to prevent the escape of the processing medium.

2. A processor, comprising a container having a feed opening, a spring-actuated closure for said opening, said container having a laterally arranged discharge opening at its bottom, a receiving surface for the prunes beneath the opening, a plunger reciprocal across said receiving surface to remove the prunes, and a jet tube within the container.

3. In a processor, the combination of a prune receiving surface, a suitable container for the fruit to be processed, means for introducing jets of hot water into the container, said container having a laterally arranged delivery outlet for the fruit and water, said container arranged to discharge by gravity, a plunger for removing the fruit, and means for collecting the water.

4. In a processor, the combination of a prune receiving surface, a suitable container for the fruit to be processed, means for introducing jets of hot water into the container, said container having a delivery outlet for the fruit and water, said container arranged to discharge by gravity, a plunger for removing the fruit, means for collecting the water, means for returning the water again through the apparatus, and means for heating the return water in transit.

5. In a processor, a container having an inclined bottom with a laterally arranged discharge opening, a grating surface beneath the discharge opening, a slotted plunger operative between the discharge opening and said grating to remove the processed fruit, and means for forcing jets of hot water over and through the fruit in the container.

6. A processing apparatus having in combination a container having a feed inlet and having a bottom which is inclined to form a lateral discharge, a receiving surface underlying said bottom, jet pipes arranged in the container and adapted to project sprays through the surrounding mass of material, a plunger reciprocable horizontally across the bottom of the container and over said receiving surface, and means for regulating the length of the processing treatment by changing the plunger stroke.

In testimony whereof I have hereunto set my hand in presence of two subscribing witnesses.

AUGUSTUS E. BIMMERLE.

Witnesses:
D. D. TENNYSON,
A. KOHNER.